(12) United States Patent
Cheng

(10) Patent No.: US 8,721,200 B1
(45) Date of Patent: May 13, 2014

(54) PROTECTOR FOR CAMERA LENS

(71) Applicant: Donell Optronics Co., Ltd., Taichung (TW)

(72) Inventor: Ming-Chung Cheng, Taichung (TW)

(73) Assignee: Donell Optronics Co., Ltd., Taichung (TW)

( * ) Notice: Subject to any disclaimer, the term of this patent is extended or adjusted under 35 U.S.C. 154(b) by 0 days.

(21) Appl. No.: 13/659,477

(22) Filed: Oct. 24, 2012

(51) Int. Cl.
*G03B 17/00* (2006.01)

(52) U.S. Cl.
USPC .......................................................... 396/448

(58) Field of Classification Search
USPC .................... 396/448; 359/808, 818, 830
See application file for complete search history.

(56) References Cited

U.S. PATENT DOCUMENTS

| | | | | |
|---|---|---|---|---|
| 2,496,584 A | * | 2/1950 | Geiger et al. | 368/294 |
| 4,302,076 A | * | 11/1981 | Hashimoto | 359/830 |
| 4,433,897 A | * | 2/1984 | Kojima et al. | 359/830 |
| 4,669,824 A | * | 6/1987 | Wallace | 359/599 |
| 5,052,782 A | * | 10/1991 | Myer | 359/827 |
| 5,177,641 A | * | 1/1993 | Kobayashi et al. | 359/820 |
| 2011/0170177 A1 | * | 7/2011 | Meissner et al. | 359/361 |

FOREIGN PATENT DOCUMENTS

| TW | I310874 | 6/2009 |
|---|---|---|
| TW | M396983 | 1/2011 |

OTHER PUBLICATIONS

Smalley Steel Ring Company—Single Turn Wave Springs (http://smalley.com/wave_springs/single_turn.asp), Nov. 28, 2010.*

* cited by examiner

*Primary Examiner* — Rodney Fuller
(74) *Attorney, Agent, or Firm* — Muncy, Geissler, Olds & Lowe, P.C.

(57) ABSTRACT

A protector for camera lens includes a shell, a lens, and a positioning member. The shell is formed with an aperture. The lens and the positioning member are received in the aperture, and the lens is restricted from dropping by the positioning member. The positioning member is formed with several axial notches, so that the positioning member is formed in a wave-shaped appearance. Thus, space between the lens and the shell is occupied by the positioning member. Acceptable tolerance of the lens and the shell is increased, and manufacturing precision requirement can be relaxed.

10 Claims, 4 Drawing Sheets

PROTECTOR FOR CAMERA LENS

BACKGROUND OF THE INVENTION

1. Field of the Invention

The present invention relates to a protector which is adapted for being assembled on a camera lens to provide protection to the camera lens.

2. Description of the Prior Art

For protecting purpose, lens cover is used for covering camera lens, as described in TWI310874. For protecting the lens during using the camera lens, protector which has a lens may be assembled on the camera lens. Because of the lens on the protector, the camera lens can be utilized under protection.

Since the protector is always assembled on the lens, producer tries to minimize the weight and the volume of the protector. The most logical way is to reduce the thickness of the protector. However, once the thickness of the protector is reduced, the thickness of the lens in the protector should also be reduced. Structure strength of the lens and the protector is then weakened, damaging protection function provided by the protector.

In comparison with the protector, TWM396983 provides another protector, which has a recessed portion defined along the periphery of the lens in the protector. The recessed portion is provided for receiving the C clip, which is used for positioning the lens, so that the thickness of the lens may be maintained. However, the protector is too difficult to be produced. The lens of the protector is provided with recessed portion, so that the space for receiving the clip is enlarged. Sizes of the recessed portion, the clip, and the other components have to be strictly precisely controlled, or the final product would be provided with a trembling lens. To precisely control the sizes of the components, production cost is inevitably increased.

The present invention is, therefore, arisen to obviate or at least mitigate the above mentioned disadvantages.

SUMMARY OF THE INVENTION

The main object of the present invention is to provide a protector for camera lens which can be produced with general precision requirement and have sufficient structure stability.

To achieve the above and other objects, a protector for camera lens of the present invention includes a shell, a lens, and a C-shaped positioning member.

The shell has a circular inner wall. An aperture is defined by the inner wall. An axial direction is defined by the aperture. The aperture has a first opening and a second opening. The inner wall is formed with a circular protrusion and a circular groove. The groove is located between the protrusion and the second opening. The groove has a circular positioning surface. The positioning surface is located at one side of the groove near to the second opening. The first opening is located at one side of the protrusion away from the second opening.

The lens is received in the aperture. The lens abuts against the protrusion. The lens has a first surface which is located away from the protrusion.

The positioning member has a first abutting surface, a second abutting surface, and two end portions. The first abutting surface and the second abutting surface are arranged along an axial direction defined by the positioning member. The positioning member is bent and deformed to be formed with three or more notches at the first abutting surface. The notches are equidistantly arranged. The positioning member is demarcated into plural extension sections by the notches. Each of the extension sections is formed with an arc shaped appearance, having concave surface at the second abutting surface and convex surface at the first abutting surface. The extension sections which are located at the end portions have lengths larger than quarter of lengths of the other extension sections and smaller than half of lengths of the other extension sections. The positioning member is received in the aperture. One of the first abutting surface and the second abutting surface abuts against the first surface of the lens, and the other abuts against the positioning surface of the groove.

Accordingly, the positioning member of the present invention is provided with a wave-shaped appearance. The positioning member abuts against the first surface of the lens and the positioning surface of the groove by the first and the second abutting surfaces. The arc-shaped extension sections are then pressing against the lens and the shell. All the space is occupied by the positioning member. As such, trembling of the lens is prohibited.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
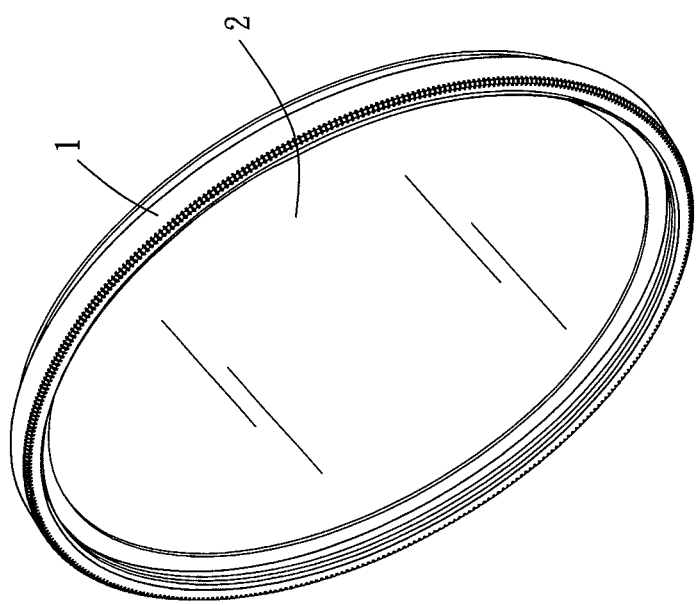
FIG. 1 is a stereogram showing a first embodiment of the present invention.

Please refer to FIG. 1. The protector for camera lens of the present embodiment is used for being assembled in front of a camera lens so as to protect the lens from accidental collision, abrasion, or sputter.

Figure 2:
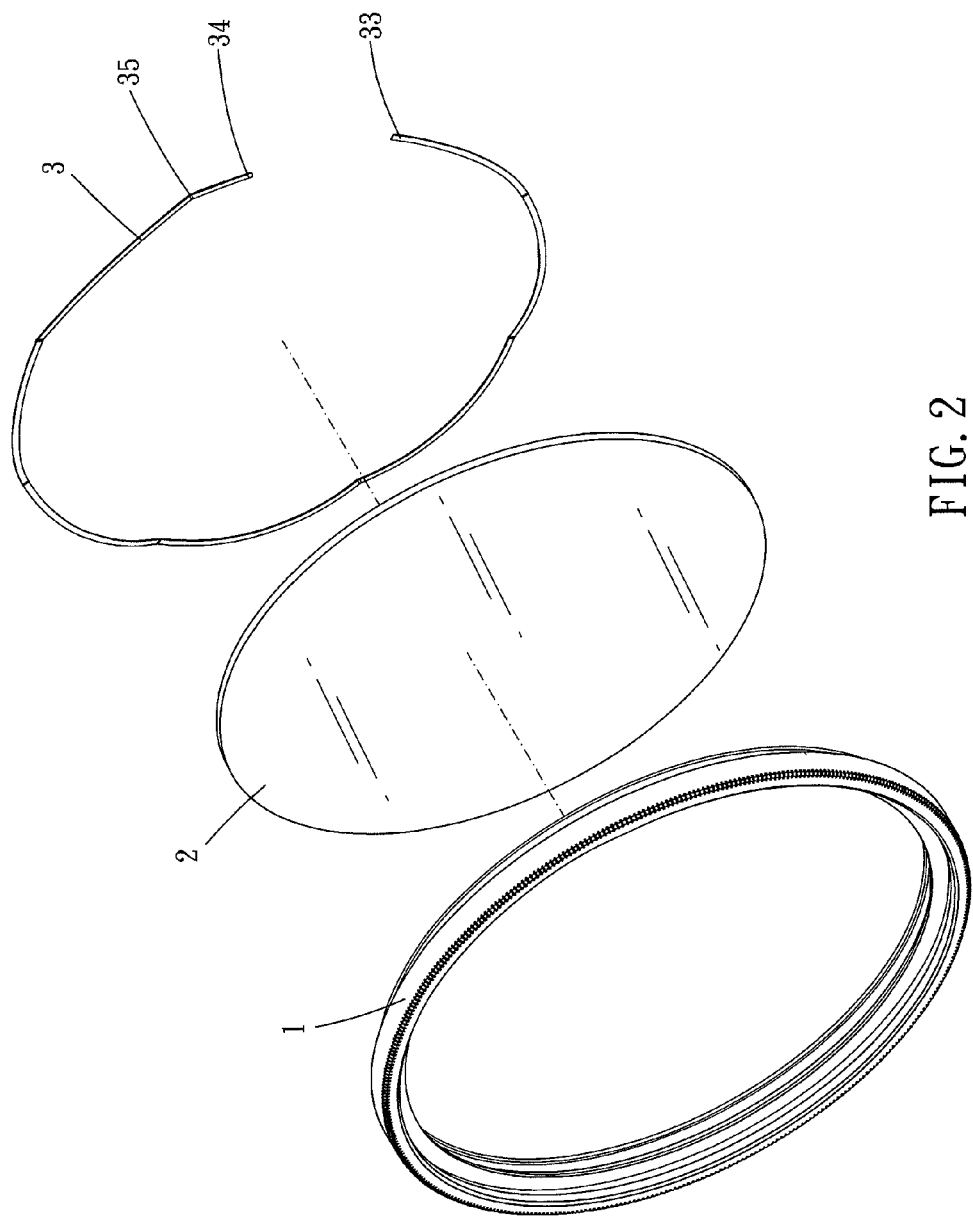
FIG. 2 is a breakdown drawing showing a first embodiment of the present invention.
Figure 3:
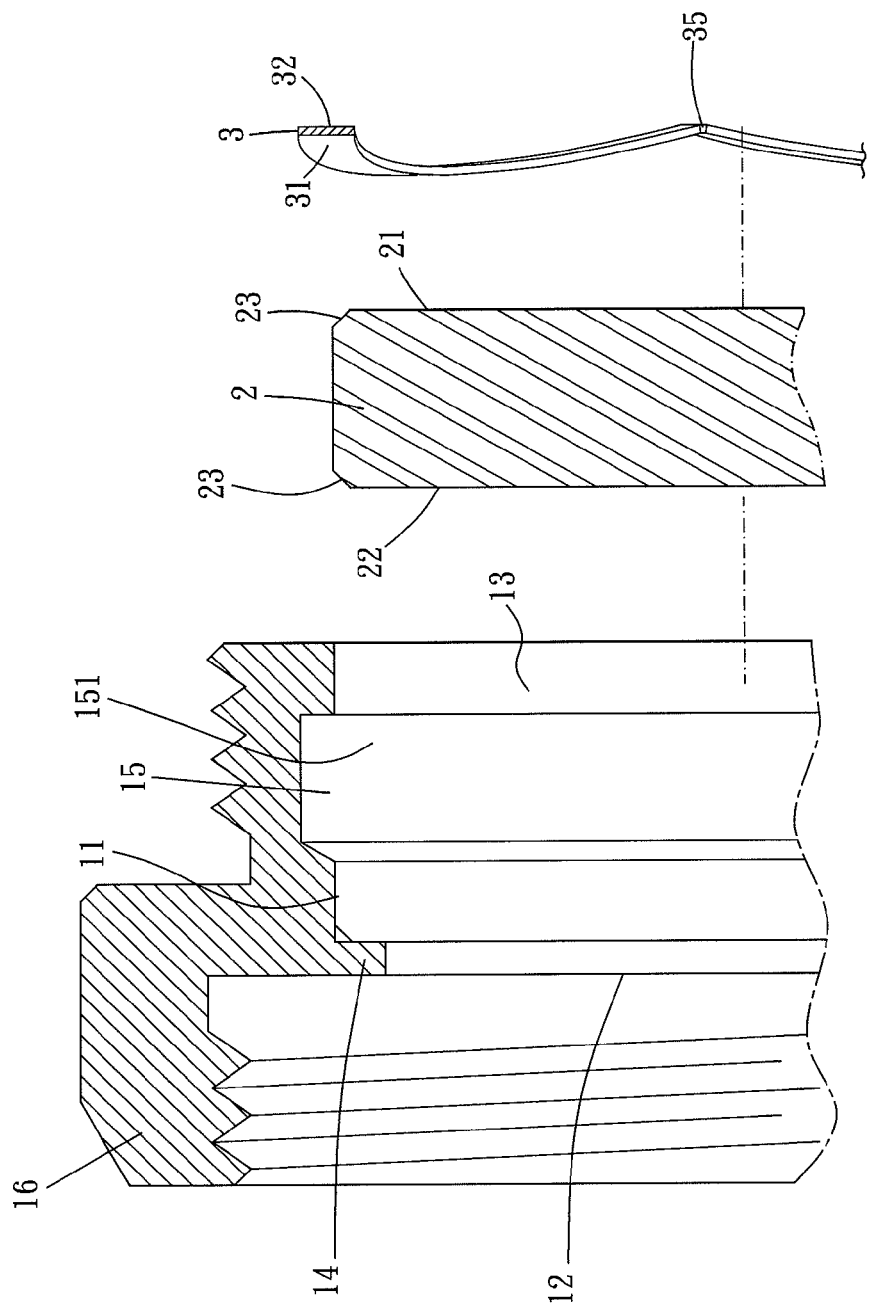
FIG. 3 is a partial profile showing a first embodiment of the present invention.
Figure 4:
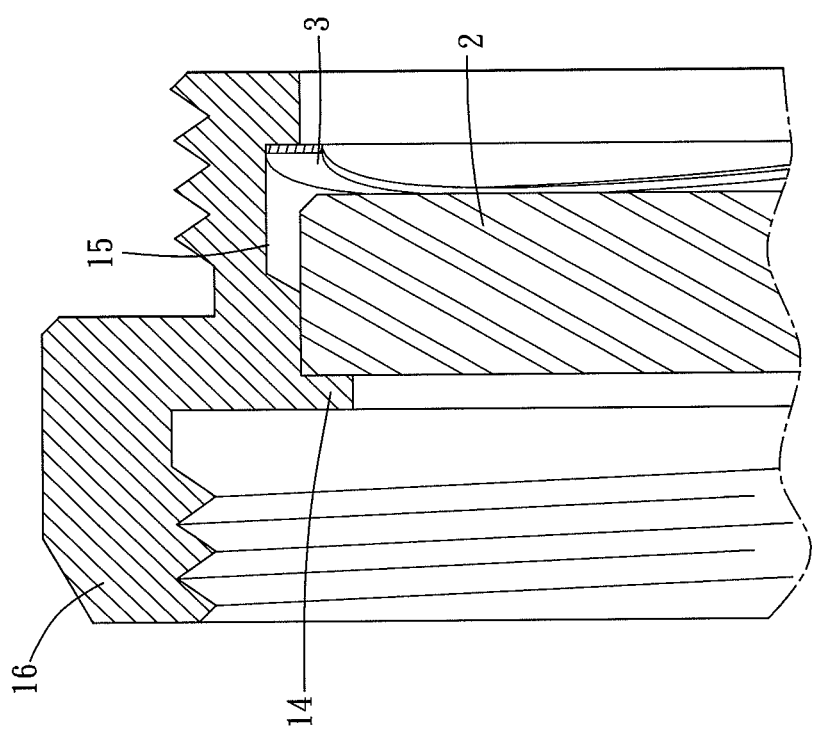
FIG. 4 is a profile showing a first embodiment of the present invention.

Please refer to FIG. 2 to FIG. 4. The protector for camera lens of the present embodiment includes a shell 1, a lens 2, and a C-shaped position member 3.

The shell 1 is made circularly as a ring, having a circular inner wall 11. The inner wall 11 defines an aperture. The aperture defines an axial direction. The aperture has a first opening 12 and a second opening 13. The inner wall 11 is formed with a circular protrusion 14 and a circular groove 15. The groove 15 is located between the protrusion 14 and the second opening 13. The first opening 12 is located at one side of the protrusion 14 away from the second opening 13. The groove 15 has a circular positioning surface 151 which is located at one side of the groove 15 near to the second opening 13. In other words, the positioning surface 151 faces toward the first opening 12. The shell 1 may be formed with a further extended fixation portion 16 extending from the first opening 12. The fixation portion may be formed with threads therein, and/or the shell 1 formed with threads thereon, so that the shell 1 can be assembled on a camera lens by threads. In other possible embodiments of the present invention, the shell 1 may be assembled to the camera lens by buckles, hooks, or other suitable apparatus.

The lens 2 is received in the aperture, abutting against the protrusion 14. The lens 2 has a first surface 21 and a second surface 22. The lens 2 may be formed with chamfering surfaces 23 along the periphery portions of the first surface 21 and the second surface 22. The first surface 21 is located away from the protrusion 14. The lens 2 may abut against the protrusion 14 by the second surface 22 or by the chamfering surface 23 around the second surface 22. Generally, the lens 2 is a plain lens, but convex lens or concave lens are also possible to be taken as a lens in protector. The lens 2 has a length along the axial direction of the aperture. The length is defined between the periphery portion of the first surface 21 and the periphery portion of the second surface 22. In other words, the length is the thickness of the periphery portion of the lens where the lens can be clipped.

The positioning member 3 is made in C-shaped. The positioning member 3 has a first abutting surface 31, a second abutting surface 32, and two end portions 33, 34. The first abutting surface 31 and the second abutting surface 32 are arranged along an axial direction of the positioning member 3. Preferably, the positioning member 3 has a quadrilateral cross section, and the first abutting surface 31 is parallel to the second abutting surface 32. The positioning member 3 is bent and deformed to be formed with three or more notches 35 at the first abutting surface 31, causing corresponding peaks at the second abutting surface 32. The notches 35 are equidistantly arranged. The positioning member 3 is demarcated into plural extension sections by the notches. Each of the extension sections is formed with an arc shaped appearance, having concave surface at the second abutting surface 32 and convex surface at the first abutting surface 31. Thus, the positioning member 3 is made wave-shaped. The extension sections which are located at the end portions 33, 34 have lengths larger than quarter of lengths of the other extension sections and smaller than half of lengths of the other extension sections. The positioning member 3 is received in the aperture, so that the space between the positioning surface 151 and the first surface 21 is stuck by the positioning member 3. The first abutting surface 31 abuts against the first surface 21 of the lens. The second abutting surface 32 abuts against the positioning surface 151 of the groove. The positioning member 3 is partially received in the groove 15. In the present embodiment, the first abutting surface presses against the first surface of the lens by the middle convex portions of the extension sections. Thus, contact area of the positioning member and the lens would not be overly diminished, preventing abrading or breaking the lens. However, it is still possible that pressing the first surface of the lens by the second abutting surface and pressing the positioning surface by the first abutting surface.

Therefore, the lens 2 is clipped and held by the protrusion 14 of the shell and the positioning member 3. As a whole device, protector, the lens 2 and the shell 1 can be assembled in front of a camera lens so as to provide protection function. The positioning member is provided with the first abutting surface and the second abutting surface to press on the lens. By the arc-shaped extension portions, the positioning member elastically presses on the lens. Thus, the space between the lens and the positioning surface of the groove is occupied by the positioning member, and trembling of the lens is prohibited.

Accordingly, the protector can be manufactured and produced under general precision requirement. Even the tolerance is increased, the cavity occurred between the lens and the groove would still be occupied by the positioning member, causing no trembling to the lens. Production cost can be effectively controlled.

In addition, the notches are equidistantly arranged. Thus, pressure caused by the positioning member to the lens can be dispersed evenly. Slant and even fracture of the lens is avoided, maintaining stability and optical performance of the lens.

Besides, because of the arc-shaped extension portions and equidistantly arranged notches, the lens is held by the positioning member stably. Thus, the positioning member 3 may be made thinner and the lens 2 may be made thicker. More particularly, the length of the positioning member 3 along the axial direction of the positioning member may smaller than 0.1 times of the length between the first opening and the second opening. Preferably, the length of the positioning member 3 is 0.09 times of the length between the first and second openings. The length of the lens along the axial direction of the aperture may larger than 0.55 times of the length between the first and second openings. Preferably, the length of the lens is 0.6 times of the length between the first and second openings. As such, the protector can be provided with strengthened structure strength and general thickness, or can be provided with general structure strength and minimized thickness.

What is claimed is:

1. A protector for camera lens, comprising:
a shell, having a circular inner wall, an aperture being defined by the inner wall, an axial direction being defined by the aperture, the aperture having a first opening and a second opening, the inner wall being formed with a circular protrusion and a circular groove, the groove being located between the protrusion and the second opening, the groove having a circular positioning surface, the positioning surface being located at one side of the groove near to the second opening, the first opening being located at one side of the protrusion away from the second opening;
a lens, received in the aperture, the lens abutting against the protrusion, the lens having a first surface which is located away from the protrusion;
a C-shaped positioning member, having a first abutting surface, a second abutting surface, and two end portions, the first abutting surface and the second abutting surface being arranged along an axial direction defined by the positioning member, the positioning member being bent and deformed to be formed with three or more notches at the first abutting surface, the notches being equidistantly arranged, the positioning member being demarcated into plural extension sections by the notches, each of the extension sections being formed with an arc shaped appearance, having concave surface at the second abutting surface and convex surface at the first abutting surface, every two adjacent extension sections being connected together with one of the notches defined therebetween, the extension sections which are located at the end portions having lengths larger than quarter of lengths of the other extension sections and smaller than half of lengths of the other extension sections, the positioning member being received in the aperture, one of the first abutting surface and the second abutting surface abutting against the first surface of the lens, and the other abutting against the positioning surface of the groove.

2. The protector for camera lens of claim 1, wherein the positioning member has a quadrilateral cross section.

3. The protector for camera lens of claim 2, wherein the first abutting surface is parallel to the second abutting surface.

4. The protector for camera lens of claim 1, wherein the first abutting surface abuts against the first surface of the lens.

5. The protector for camera lens of claim 4, wherein the first abutting surface is parallel to the second abutting surface.

6. The protector for camera lens of claim 1, wherein the first abutting surface is parallel to the second abutting surface.

7. The protector for camera lens of claim 1, wherein a length of the lens along the axial direction of the aperture is larger than 0.55 times of a length between the first opening and the second opening.

8. The protector for camera lens of claim 1, wherein a length of the lens along the axial direction of the aperture is 0.6 times of a length between the first opening and the second opening.

9. The protector for camera lens of claim 1, wherein a length of the positioning member along the axial direction of the positioning member is smaller than 0.1 times of a length between the first opening and the second opening.

10. The protector for camera lens of claim 1, wherein a length of the positioning member along the axial direction of the positioning member is 0.09 times of a length between the first opening and the second opening.

\* \* \* \* \*